(12) United States Patent
Fard et al.

(10) Patent No.: US 12,162,194 B2
(45) Date of Patent: Dec. 10, 2024

(54) METHODS, DEVICES, AND SYSTEMS ASSOCIATED WITH SMOKING SUBSTITUTE DEVICES

(71) Applicant: Imperial Tobacco Limited, Bristol (GB)

(72) Inventors: Daniel Fard, Liverpool (GB); Oliver Talbot, Liverpool (GB)

(73) Assignee: Imperial Tobacco Limited, Bristol (GB)

(*) Notice: Subject to any disclaimer, the term of this patent is extended or adjusted under 35 U.S.C. 154(b) by 1087 days.

(21) Appl. No.: 17/000,940

(22) Filed: Aug. 24, 2020

(65) Prior Publication Data

US 2021/0037894 A1 Feb. 11, 2021

Related U.S. Application Data

(63) Continuation of application No. PCT/EP2019/053489, filed on Feb. 13, 2019.

(30) Foreign Application Priority Data

Feb. 26, 2018 (GB) .................................. 1803034

(51) Int. Cl.
*B29C 45/14* (2006.01)
*A24F 40/42* (2020.01)
(Continued)

(52) U.S. Cl.
CPC .............. *B29C 45/14* (2013.01); *A24F 40/42* (2020.01); *A24F 40/53* (2020.01); *A24F 40/65* (2020.01);
(Continued)

(58) Field of Classification Search
CPC .......... A24F 40/10; A24F 40/42; A24F 40/53; A24F 40/65; A24F 40/70; B29C 2045/14852; B29C 45/14
See application file for complete search history.

(56) References Cited

U.S. PATENT DOCUMENTS 9,615,646 B2 * 4/2017 Geva ...................... A61H 7/003
2003/0186009 A1 10/2003 Odamura et al.
(Continued)

FOREIGN PATENT DOCUMENTS

DE 102004046003 A1 3/2006
EP 2 399 636 A1 12/2011
(Continued)

OTHER PUBLICATIONS

International Search Report, mailed Jul. 8, 2019, in PCT/EP2019/053489, filed Feb. 13, 2019.
(Continued)

*Primary Examiner* — Abdullah A Riyami
*Assistant Examiner* — Thang H Nguyen
(74) *Attorney, Agent, or Firm* — DUNLAP CODDING, P.C.

(57) ABSTRACT

A method of forming a consumable for use in a smoking substitute device, the method including: providing a machine readable component which stores information associated with the consumable; overmoulding the machine readable component with an overmoulding material to coat at least part of the machine readable component with the overmoulding material; and including the overmoulded machine readable component in the consumable. Associated devices and systems are also disclosed.

11 Claims, 5 Drawing Sheets

(51) Int. Cl.
*A24F 40/53* (2020.01)
*A24F 40/65* (2020.01)
*A24F 40/70* (2020.01)
*A24F 40/10* (2020.01)

(52) U.S. Cl.
CPC .............. *A24F 40/70* (2020.01); *A24F 40/10* (2020.01); *B29C 2045/14852* (2013.01)

(56) References Cited

U.S. PATENT DOCUMENTS

| | | | |
|---|---|---|---|
| 2013/0220315 A1* | 8/2013 | Conley | A24F 40/44 128/202.21 |
| 2015/0181945 A1* | 7/2015 | Tremblay | A24F 40/60 131/328 |
| 2017/0014582 A1* | 1/2017 | Skoda | A61M 15/06 |
| 2017/0020191 A1* | 1/2017 | Lamb | A24F 40/40 |
| 2018/0043114 A1* | 2/2018 | Bowen | A61M 15/003 |
| 2018/0093401 A1* | 4/2018 | Geiger | B65D 35/10 |

FOREIGN PATENT DOCUMENTS

| WO | WO 2012/059923 A1 | 5/2012 |
|---|---|---|
| WO | WO 2016/187695 A1 | 12/2016 |
| WO | WO 2017/205692 A1 | 11/2017 |

OTHER PUBLICATIONS

Written Opinion of the International Searching Authority, mailed Jul. 8, 2019, in PCT/EP2019/053489, filed Feb. 13, 2019.
Matthew Naitove et al., "Pushing the Limits on Overmolded RFID Tags", Plastics Technology <https://wwww.ptonline.com/articles/pushing-the-limits-in-overmolded-rfid-tags>, 2014, 2 pages.
Naitove et al, "Pushing the Limits in Overmolded RFID Tags", Plastics Technology (2014), 2 pages.
UKIPO Combined Search and Examination Report (GB1803034.6), dated Jun. 29, 2018, 7 pages.

* cited by examiner

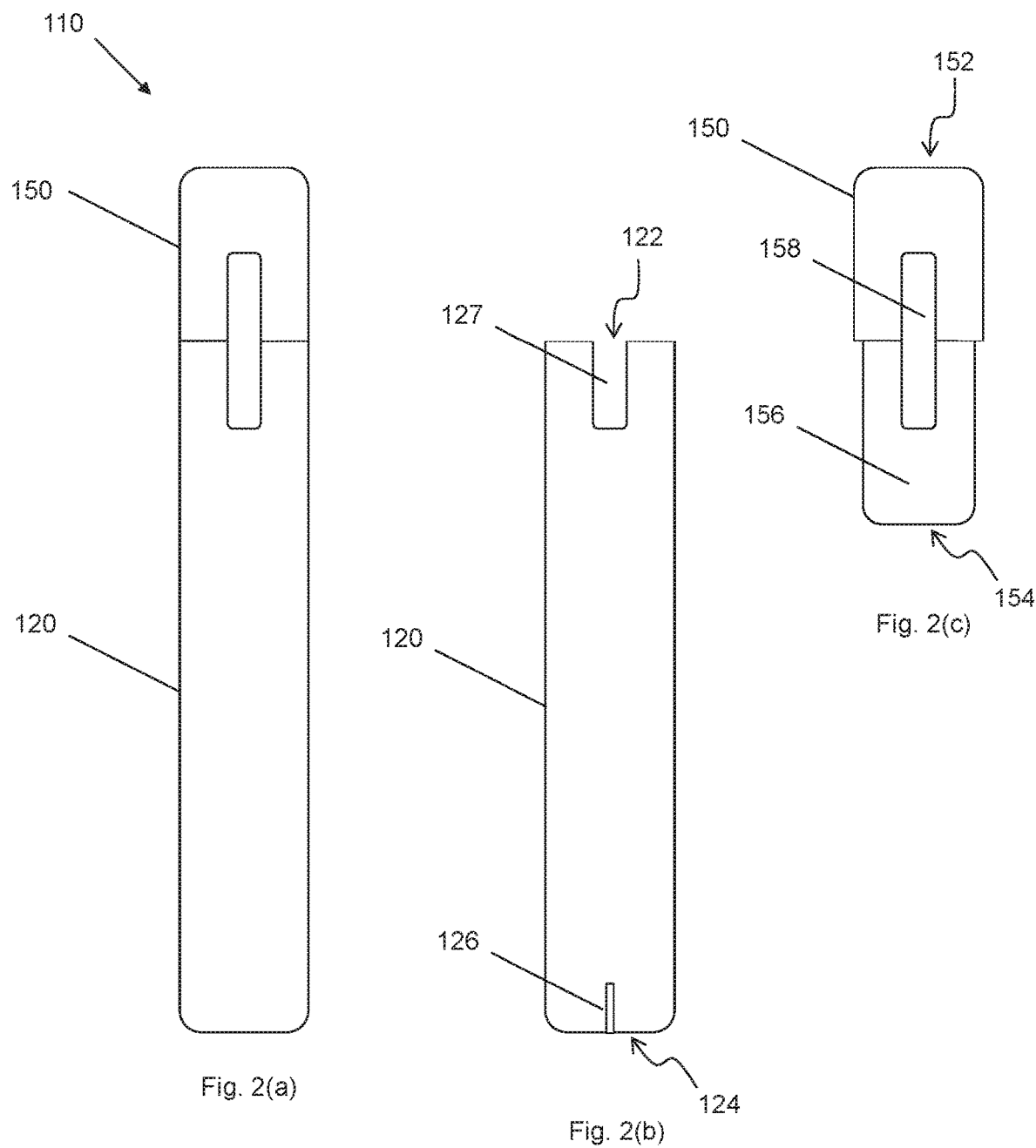

METHODS, DEVICES, AND SYSTEMS ASSOCIATED WITH SMOKING SUBSTITUTE DEVICES

CROSS-REFERENCE TO RELATED APPLICATIONS/INCORPORATION BY REFERENCE STATEMENT

The present patent application is a continuation of International Application No. PCT/EP2019/053489, filed Feb. 13, 2019; which claims priority to the patent application identified by GB Serial No. 1803024.6, filed on Feb. 26, 2018. The entire contents of each of the above-referenced patent(s)/patent application(s) are hereby expressly incorporated by reference herein.

TECHNICAL FIELD

The present disclosure relates to methods of forming a consumable for use in a smoking substitute device, consumables for use in a smoking substitute device, smoking substitute devices, and systems for managing smoking substitute devices.

BACKGROUND

The smoking of tobacco is generally considered to expose a smoker to potentially harmful substances. It is generally thought that a significant amount of the potentially harmful substances are generated through the heat caused by the burning and/or combustion of the tobacco and the constituents of the burnt tobacco in the tobacco smoke itself.

Combustion of organic material such as tobacco is known to produce tar and other potentially harmful by-products. There have been proposed various smoking substitute devices in order to avoid the smoking of tobacco.

Such smoking substitute devices can form part of nicotine replacement therapies aimed at people who wish to stop smoking and overcome a dependence on nicotine.

Smoking substitute devices may comprise electronic systems that permit a user to simulate the act of smoking by producing an aerosol, also referred to as a "vapour," that is drawn into the lungs through the mouth (inhaled) and then exhaled. The inhaled aerosol typically bears nicotine and/or flavourings without, or with fewer of, the odour and health risks associated with traditional smoking.

In general, smoking substitute devices are intended to provide a substitute for the rituals of smoking, whilst providing the user with a similar experience and satisfaction to those experienced with traditional smoking and tobacco products.

The popularity and use of smoking substitute devices has grown rapidly in the past few years. Although originally marketed as an aid to assist habitual smokers wishing to quit tobacco smoking, consumers are increasingly viewing smoking substitute devices as desirable lifestyle accessories. Some smoking substitute devices are designed to resemble a traditional cigarette and are cylindrical in form with a mouthpiece at one end. Other smoking substitute devices do not generally resemble a cigarette (for example, the smoking substitute device may have a generally box-like form).

There are a number of different categories of smoking substitute devices, each utilising a different smoking substitute approach. A smoking substitute approach corresponds to the manner in which the substitute system operates for a user.

One approach for a smoking substitute device is the so-called "vaping" approach, in which a vapourisable liquid, typically referred to (and referred to herein) as "e-liquid," is heated by a heating device to produce an aerosol vapour which is inhaled by a user. An e-liquid typically includes a base liquid as well as nicotine and/or flavourings. The resulting vapour therefore typically contains nicotine and/or flavourings. The base liquid may include propylene glycol and/or vegetable glycerin.

A typical vaping smoking substitute device includes a mouthpiece, a power source (typically a battery), a tank for containing e-liquid, as well as a heating device. In use, electrical energy is supplied from the power source to the heating device, which heats the e-liquid to produce an aerosol (or "vapour") which is inhaled by a user through the mouthpiece.

Vaping smoking substitute devices can be configured in a variety of ways. For example, there are "closed system" vaping smoking substitute devices which typically have a sealed tank and heating element which is pre-filled with e-liquid and is not intended to be refilled by an end user. One subset of closed system vaping smoking substitute devices include a main body which includes the power source, wherein the main body is configured to be physically and electrically coupled to a consumable including the tank and the heating element. In this way, when the tank of a consumable has been emptied, the main body can be reused by connecting it to a new consumable. Another subset of closed system vaping smoking substitute devices are completely disposable, and intended for one-use only.

There are also "open system" vaping smoking substitute devices which typically have a tank that is configured to be refilled by a user, so the device can be used multiple times.

An example vaping smoking substitute device is the myblu™ e-cigarette. The myblu™ e-cigarette is a closed system device which includes a main body and a consumable. The main body and consumable are physically and electrically coupled together by pushing the consumable into the main body. The main body includes a rechargeable battery. The consumable includes a mouthpiece, a sealed tank which contains e-liquid, as well as a heating device, which for this device is a heating filament coiled around a portion of a wick which is partially immersed in the e-liquid. The device is activated when a microprocessor on board the main body detects a user inhaling through the mouthpiece. When the device is activated, electrical energy is supplied from the power source to the heating device, which heats e-liquid from the tank to produce a vapour which is inhaled by a user through the mouthpiece.

Another example vaping smoking substitute device is the blu PRO™ e-cigarette. The blu PRO™ e-cigarette is an open system device which includes a main body, a (refillable) tank, and a mouthpiece. The main body and tank are physically and electrically coupled together by screwing one to the other. The mouthpiece and refillable tank are physically coupled together by screwing one of the other, and detaching the mouthpiece from the refillable tank allows the tank to be refilled with e-liquid. The device is activated by a button on the main body. When the device is activated, electrical energy is supplied from the power source to a heating device, which heats e-liquid from the tank to produce a vapour which is inhaled by a user through the mouthpiece.

Another approach for a smoking substitute device is the so-called "heat not burn" ("HNB") approach in which tobacco (rather than e-liquid) is heated or warmed to release vapour. The tobacco may be leaf tobacco or reconstituted tobacco. The vapour may contain nicotine and/or flavourings. In the HNB approach the intention is that the tobacco is heated but not burned, i.e. does not undergo combustion.

A typical HNB smoking substitute device may include a main body and a consumable. The consumable may include the tobacco material. The main body and consumable may be configured to be physically coupled together. In use, heat may be imparted to the tobacco material by a heating device that is typically located in the main body, wherein airflow through the tobacco material causes moisture in the tobacco material to be released as vapour. A vapour may be formed from a carrier in the tobacco material (this carrier may for example include propylene glycol and/or vegetable glycerin) and additionally volatile compounds released from the tobacco. The released vapour may be entrained in the airflow drawn through the tobacco.

As the vapour passes through the smoking substitute device (entrained in the airflow) from an inlet to a mouthpiece (outlet), the vapour cools and condenses to form an aerosol (also referred to as a vapour) for inhalation by the user. The aerosol will normally contain the volatile compounds.

In HNB smoking substitute devices, heating as opposed to burning the tobacco material is believed to cause fewer, or smaller quantities, of the more harmful compounds ordinarily produced during smoking. Consequently, the HNB approach may reduce the odour and/or health risks that can arise through the burning, combustion and pyrolytic degradation of tobacco.

An example of the HNB approach is the IQOS™ smoking substitute device from Philip Morris Ltd. The IQOS™ smoking substitute device uses a consumable, including reconstituted tobacco located in a wrapper. The consumable includes a holder incorporating a mouthpiece. The consumable may be inserted into a main body that includes a heating device. The heating device has a thermally conductive heating knife which penetrates the reconstituted tobacco of the consumable, when the consumable is inserted into the heating device. Activation of the heating device heats the heating element (in this case a heating knife), which, in turn, heats the tobacco in the consumable. The heating of the tobacco causes it to release nicotine vapour and flavourings which may be drawn through the mouthpiece by the user through inhalation.

A second example of the HNB approach is the device known as "Glo"™ from British American Tobacco p.l.c. Glo™ comprises a relatively thin consumable. The consumable includes leaf tobacco which is heated by a heating device located in a main body. When the consumable is placed in the main body, the tobacco is surrounded by a heating element of the heating device. Activation of the heating device heats the heating element, which, in turn, heats the tobacco in the consumable. The heating of the tobacco causes it to release nicotine vapour and flavourings which may be drawn through the consumable by the user through inhalation. The tobacco, when heated by the heating device, is configured to produce vapour when heated rather than when burned (as in a smoking apparatus, e.g. a cigarette). The tobacco may contain high levels of aerosol formers (carrier), such as vegetable glycerine ("VG") or propylene glycol ("PG").

The present inventor(s) have observed that most smoking substitute devices currently on the market are configured to operate in isolation of other devices, which limits the functions the smoking substitute devices can perform.

US 2017/020191 A describes a control body and cartridge that are coupleable with one another to form an aerosol delivery device. The control body comprises a control component and an RFID reader contained within at least one housing. The cartridge comprises at least one heating element and an RFID tag contained within at least one housing. The RFID reader of the control body is coupled to the control component of the control body and configured to communicate with the RFID tag of the cartridge upon coupling of the control body with the cartridge. The control component of the control body is configured to authorize the cartridge for use with the control body based at least in part on communication between the RFID reader and the RFID tag.

WO 2017/205692 A1 describes vaporizers and vaporizer systems, including a device in communication with a vaporizer, one or more features related to control of functions and/or features of the vaporizer, identification of a cartridge and/or a vaporizable material in the cartridge and data exchange (either one-way or two-way) between a cartridge and a vaporizer with which the cartridge is engaged.

US 2017/0014582 A1 describes a vaporization and inhalation apparatus comprising a cartridge container configured to receive a cartridge including a liquid. The apparatus includes a heating element configured to heat the liquid to a point of vaporization to generate a vaporized form of the liquid. The apparatus also includes an outlet port through which the vaporized form of the liquid is inhaled.

EP 2 399 969 A1 describes a liquid storage portion comprising an electrical component for distinguishing the storage portion from other liquid storage portions. The liquid storage portion is configured for use in an aerosol generating system having means for determining an electrical characteristic of the electrical component and means for distinguishing the liquid storage portion from other liquid storage portions based on the determined electrical characteristic of the electrical component.

WO 2016/187695 A1 describes a vaporizer apparatus for a compressed tablet formed from a plant source material containing medicinal ingredients of therapeutic efficacy. In an embodiment, the apparatus includes: a holder for a compressed tablet; a microprocessor; a controlled air flow; and a controlled heat source; wherein the microprocessor is adapted to control the air flow and the heat source to vaporize the compressed tablet received in the compressed tablet holder at a desired rate. In another embodiment, the vaporizer apparatus includes a carousel for receiving a disc cartridge containing packaged compressed tablets. In still another embodiment, the vaporizer apparatus is adapted to recognize a type of compressed tablet placed into the holder, and to control an air flow and a heat source based on selected therapeutic compounds desired to be released from the recognized type of compressed tablet.

The present disclosure has been devised in light of the above considerations.

BRIEF DESCRIPTION OF THE DRAWINGS

Embodiments and experiments illustrating the principles of the present disclosure will now be discussed with reference to the accompanying figures in which:

FIG. 2(a) shows an example smoking substitute device for use as the smoking substitute device in the system of FIG. 1.

FIG. 2(b) shows the main body of the smoking substitute device of FIG. 2(a) without the consumable.

FIG. 2(c) shows the consumable of the smoking substitute device of FIG. 2(a) without the main body.

DETAILED DESCRIPTION

Figure 1:
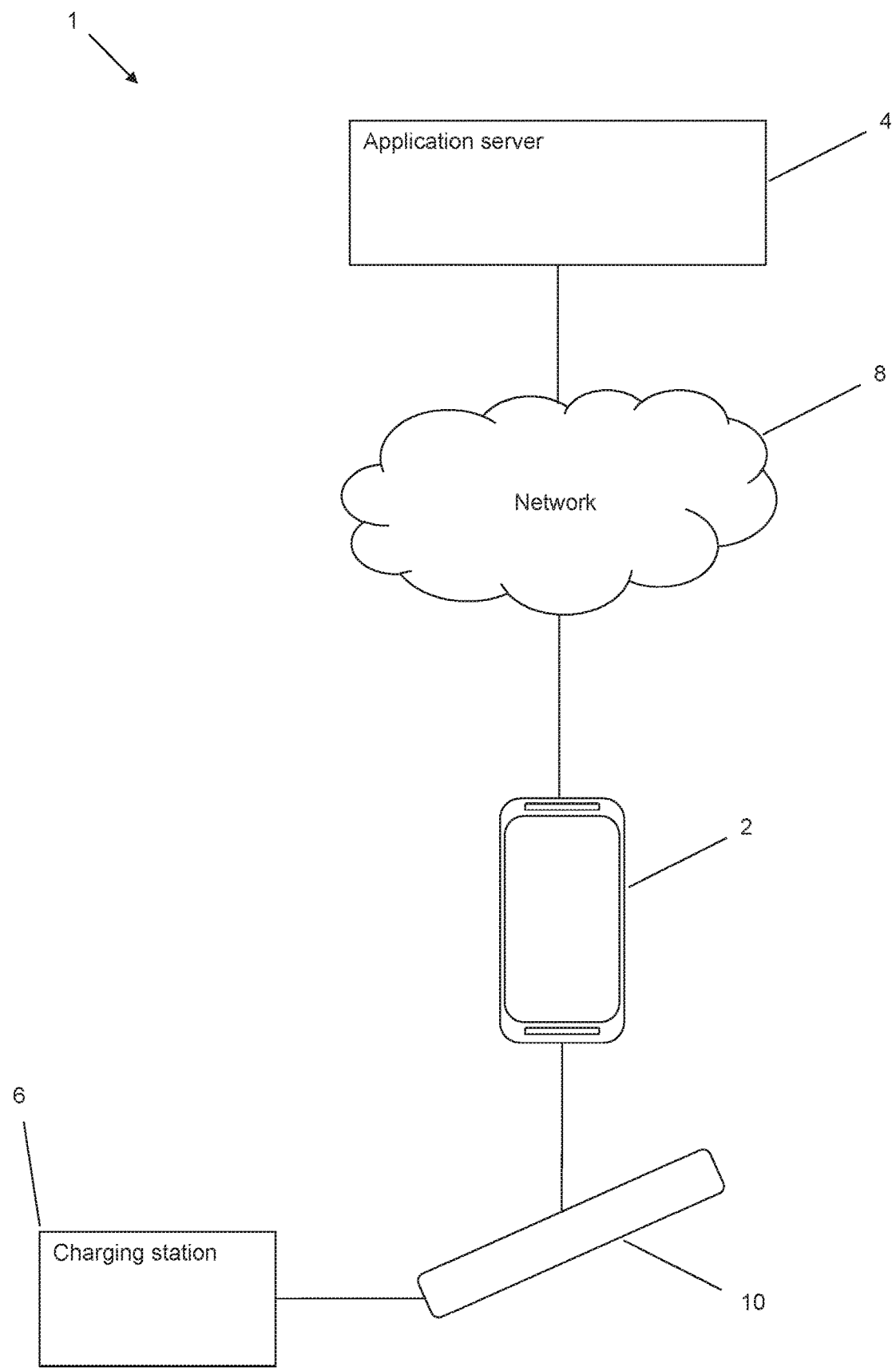
FIG. 1 shows an example system for managing a smoking substitute device.

In a first non-limiting aspect of the present disclosure, there is provided a method of forming a consumable for use in a smoking substitute device, the method including: providing a machine readable component which stores information associated with the consumable; overmoulding the machine readable component with an overmoulding material to coat at least part of the machine readable component with the overmoulding material; and including the overmoulded machine readable component in the consumable.

For the purposes of this disclosure, overmoulding can be understood as an injection moulding process wherein an overmoulding material is injected into a mould containing an insert to be overmoulded (e.g. the machine readable component) such that the liquid overmoulding material coats at least a part of the insert (optionally the entire insert so that the insert is encapsulated by the overmoulding material), and then allowing the liquid overmoulding material to set, thereby coating at least part of the insert (optionally encapsulating the insert) in the overmoulding material. Typically, an overmoulding material is liquid under certain conditions (e.g. at high temperatures) and solid under other conditions (e.g. at lower temperatures). It is common for an overmoulding material to be a plastic material.

Techniques for overmoulding, including techniques for overmoulding electronic components, are known. Techniques for overmoulding electronic components are sometimes referred to as "low pressure moulding" and typically involve lower injection pressures than overmoulding techniques for overmoulding less fragile inserts.

In certain non-limiting embodiments, the machine readable component is encapsulated by the overmoulding material. However, it is also possible that the machine readable component could be only partially coated by the overmoulding material.

Advantageously, the overmoulded machine readable component, particularly if it is encapsulated by the overmoulding material, may be more waterproof, more dustproof, less vulnerable to corrosion and/or more shock resistant than a non-overmoulded machine readable component.

The overmoulded machine readable component may itself be overmoulded with a further overmoulding material to coat at least part of the overmoulded machine readable component with the overmoulding material, e.g. so as to further protect the machine readable component and/or facilitate its attachment to other components within the consumable, since overmoulding is a way to securely join multiple components together without the need for adhesives.

As the overmoulding process uses a mould, the overmoulded machine readable component can be moulded into any mouldable shape. This means that the overmoulded machine readable component could be shaped to form a component of the consumable.

In certain non-limiting embodiments, the overmoulded machine readable component is shaped (and, in a particular (but non-limiting) embodiment, also used) as a component of the consumable. In this case, the step of including the overmoulded machine readable component in the consumable may comprise assembling together multiple components to form the consumable, wherein one of the components is the overmoulded machine readable component.

By way of example, the overmoulded machine readable component could be shaped (and, in a particular (but non-limiting) embodiment, also used) as a container configured to contain consumable material within the consumable. For example, the overmoulded machine readable component could be shaped (and, in a particular (but non-limiting) embodiment, also used) as a tank configured to contain e-liquid in the consumable (as may be suitable for a vaping smoking substitute device). For example, the overmoulded machine readable component could be shaped (and, in a particular (but non-limiting) embodiment, also used) as a container configured to contain tobacco material within the consumable.

As another example, the overmoulded machine readable component could be shaped (and, in a particular (but non-limiting) embodiment, also used) as an outer casing of the consumable.

As another example, the overmoulded machine readable component could be shaped (and, in a particular (but non-limiting) embodiment, also used) as a mouthpiece of the consumable.

The machine readable component may include a memory for storing the information associated with the consumable.

In certain non-limiting embodiments, the machine readable component is wirelessly readable. To this end, the machine readable component may include an antenna for transmitting a signal containing the information associated with the consumable which can be read by an external device (e.g. by a reader included in a main body of a smoking substitute device, as described below).

In certain non-limiting embodiments, the machine readable component is an RFID tag.

An RFID tag is an electronic machine readable component from which information can be wirelessly read by an RFID reader using electromagnetic waves, typically radio waves. An RFID tag typically includes an antenna for transmitting a signal containing information stored by the RFID tag which can be read by an RFID reader.

In certain non-limiting embodiments, the machine readable component is a passive RFID tag.

As is known, a passive RFID tag has no power source and is instead powered (to produce a signal containing information stored by the RFID tag which can be read by an RFID reader) by electromagnetic energy transmitted to it from an RFID reader. In contrast, an active RFID tag has a power source that it can use to produce a signal that can be read by an RFID reader.

The RFID tag may be rewritable to allow the tag to be written to store new information associated with the consumable.

Although a passive RFID tag is desired in certain non-limiting embodiments, the machine readable component may instead operate using one of Near-field communication (NFC), Bluetooth or Wi-Fi technology. To this end, the machine readable component may include an antenna for transmitting a signal containing the information associated with the consumable which can be read by an external device in accordance with one of these technologies.

The machine readable component could include a visual pattern which stores the information associated with the consumable, e.g. in the form of a 1D or 2D barcode. In this case, the overmoulding material may be transparent or not coat visual pattern to allow the visual pattern to be read optically (e.g. using a camera of a mobile device).

Although the machine readable component is wirelessly readable in certain particular (but non-limiting) embodiments, the machine readable component could be configured to be read by direct electronic connection to an external device. To this end, the machine readable component could include an electrical interface configured to allow the information associated with the consumable to be read from the machine readable component by direct electronic connection to an external device. If the electrical interface is included, then in certain non-limiting embodiments, the overmoulding material desirably does not coat the electrical interface.

The information associated with the consumable stored by the machine readable component may include any one or more of: ID information for identifying the consumable (e.g. for uniquely identifying the consumable or for uniquely identifying a batch of consumables to which the consumable belongs); a flavour (or e.g. a scent) of consumable material contained in the consumable; an amount (e.g. volume or mass) of consumable material contained in the consumable; a temperature at which consumable material contained in the consumable should be heated; a parameter indicating how the consumable should be used (e.g. a voltage that should be supplied to the consumable); a size of a tank included in the consumable for containing consumable material; and/or one or more measured variables associated with the consumable device (e.g. as measured by a measuring component as described in relation to the third non-limiting aspect of the present disclosure).

This list is not intended to be exhaustive. The machine readable component may store other items of information associated with the consumable.

The consumable may contain a consumable material. If the consumable is for use in a vaping smoking substitute device, the consumable material may be e-liquid contained in a tank of the consumable. The tank may be sealed. If the consumable is for use in a HNB smoking substitute device, the consumable material may be a tobacco material contained in a container of the consumable.

The consumable may be configured to physically couple to a main body of the smoking substitute device.

The consumable may include a heating device configured to heat consumable material contained in the consumable, e.g. so as to produce a vapour. However, a heating device may instead be included in a main body configured to physically couple to the consumable (as might be the case for a HNB smoking substitute device, for example).

The consumable may include one or more air inlets configured to allow air to be drawn into the consumable.

The consumable may include a mouthpiece for inhaling vapour produced by heating consumable material contained in the consumable.

The consumable may include an electrical interface for electrically coupling the consumable to a main body of a smoking substitute device, e.g. when the consumable is physically coupled to the main body.

The consumable may include one or more other components, e.g. as explained elsewhere in this document.

A second non-limiting aspect of the present disclosure may provide a consumable formed by a method according to the first non-limiting aspect of the present disclosure.

The second non-limiting aspect of the present disclosure may therefore provide a consumable for use in a smoking substitute device including: a machine readable component which contains information associated with the consumable; and wherein at least part of the machine readable component is coated with an overmoulding material.

The consumable may have any feature described or resulting from a method step described in connection with the first non-limiting aspect of the present disclosure.

A third non-limiting aspect of the present disclosure may provide a consumable for use in a smoking substitute device including: at least one measuring component configured to measure a variable associated with the consumable device; and a machine readable component configured to store the/each measured variable, e.g. such that the/each measured variable can be read by an external device (e.g. by a reader included in a main body of a smoking substitute device, as described below).

The/each measured variable is an example of information associated with the consumable that could be stored by the machine readable component in the first and/or second non-limiting aspect of the present disclosure.

The at least one measuring component may for example include an electrical component configured to measure a resistance of consumable material contained in the consumable, e.g. e-liquid contained in a tank of the consumable.

The at least one measuring component may for example include an electrical component configured to measure a capacitance of consumable material contained in the consumable, e.g. e-liquid contained in a tank of the consumable.

The at least one measuring component may for example include an electrical component configured to measure an inductance of consumable material contained in the consumable, e.g. e-liquid contained in a tank of the consumable.

The at least one measuring component may for example include a component configured to measure a variable describing another property of consumable material, e.g. opacity.

The machine readable component may include a memory for storing the/each measured variable.

In certain non-limiting embodiments, the machine readable component is wirelessly readable, and could be as described in connection with the first and/or second non-limiting aspect of the present disclosure.

For example, the machine readable component could be an RFID tag, such as (but not limited to) a passive RFID tag. The RFID tag may be rewritable to allow the tag to be written to store the/each measured variable.

At least part of the machine readable component may be coated with an overmoulding material, e.g. in a manner described in connection with the first and/or second non-limiting aspect of the present disclosure.

Although the machine readable component is desirably wirelessly readable in certain particular (but non-limiting) embodiments, the machine readable component could be configured to be read by direct electronic connection to an external device. To this end, the machine readable component could include an electrical interface configured to allow the/each measured variable to be read from the machine readable component by direct electronic connection to an external device. If the electrical interface is included and the machine readable component is overmoulded, then in certain particular (but non-limiting) embodiments, the overmoulding material desirably does not coat the electrical interface.

A fourth non-limiting aspect of the present disclosure provides a smoking substitute device including: a main body; a consumable configured to be physically coupled to the main body; wherein the consumable includes a machine readable component storing information associated with the consumable, and is a consumable according to second and/or third non-limiting aspect of the present disclosure.

The information associated with the consumable stored by the machine readable component could include information associated with the consumable as described in connection with the first and/or second non-limiting aspect of the present disclosure, and/or one or more measured variables as described in connection with the third non-limiting aspect of the present disclosure.

The smoking substitute device may be a vaping smoking substitute device or a HNB smoking substitute device, for example.

The main body may include a reader configured to read the information associated with the consumable stored by the machine readable component.

The reader included in the main body may be configured to read the information stored by the machine readable component when the consumable is physically coupled to the main body.

The reader may be configured to wirelessly read the information stored by the machine readable component, i.e. without a direct electrical connection to the machine readable component. To this end, the reader may include an antenna configured to receive a signal containing the information stored by the machine readable component, where that signal has been transmitted by the machine readable component. Alternatively, the reader could include a camera for optically reading the information stored by the machine readable component, where this information has been stored as a visual pattern, e.g. as described above.

If the machine readable component included in the consumable is an RFID tag, the reader included in the main body may be an RFID reader configured to (wirelessly) read information from the RFID tag included in the consumable. The RFID tag and RFID reader may respectively be located on/in the consumable and the main body so that the RFID reader is only able to read the information stored by the RFID tag when the consumable is physically coupled to the main body. An RFID reader would typically include an antenna, as is known in the art.

The reader may be configured to read the machine readable component by direct electronic connection to the machine readable component. To this end, the reader could include or be connected to an electrical interface configured to read the information stored by the machine readable component by direct electrical connection to the machine readable component, e.g. via a wire.

The main body may include any one or more of: a power source (e.g. a battery), a control unit, a memory, a wireless interface configured to communicate wirelessly with a mobile device (e.g. via Bluetooth™), and/or an electrical interface configured to pass electrical power from a power source included in the main body to (e.g. a heating device of) the consumable.

The main body and the consumable may be physically coupled together (and optionally electrically coupled together), for example, by pushing the consumable into the main body or screwing one to the other. They could also be coupled together using a bayonet connection.

If information stored by the machine readable component includes one or more measured variables (see discussion of the third non-limiting aspect of the present disclosure), the main body (e.g. a control unit in the main body) may be configured to determine information about consumable material contained in the consumable (e.g. a flavour of e-liquid contained in the consumable) based on the one or more measured variables read by the main body from the machine readable component. For example, the main body may be configured to determine information about consumable material contained in the consumable by comparing one or more measured variables read from the machine readable component with a database (e.g. the one or more measured variables read from the machine readable component could be used as a "key" to look up information about consumable material contained in the consumable in the database).

A fifth non-limiting aspect of the present disclosure provides a system for managing a smoking substitute device including: a smoking substitute device according to the fourth non-limiting aspect of the present disclosure; a mobile device on which an application installed, wherein the smoking substitute device is configured to communicate with the application.

The mobile device could be a mobile phone or tablet, for example.

The smoking substitute device may be configured to wirelessly communicate with the application, e.g. via a wireless interface on the smoking substitute device and a corresponding wireless interface on the mobile device.

The system may include an application server. The application on the mobile phone may be configured to communicate with the application server, e.g. via a network.

If the main body includes a reader configured to read the information associated with the consumable stored by the machine readable component, the main body may be configured to communicate the information associated with the consumable to the application. Alternatively, the mobile device may be configured to read the information associated with the consumable stored by the machine readable component directly from the machine readable component, e.g. using a camera or an antenna of the mobile device.

The main body (e.g. a control unit in the main body), application and/or application server may be configured to process the information associated with the consumable stored by the machine readable component, e.g. so as to allow the information associated with the consumable (or information derived from the information associated with the consumable) to be presented to a user, e.g. via the application. Note that the application could receive the information associated with the consumable though that information being read by the main body and then communicated to the application by the main body or through the mobile device reading that information directly.

If the machine readable component is configured to store one or more measured variables (see discussion of the third non-limiting aspect of the present disclosure), the main body (e.g. a control unit in the main body), the application and/or the application server may be configured to determine information about consumable material contained in the consumable (e.g. a flavour of e-liquid contained in the consumable) based on one or more measured variables read from the machine readable component. For example, the main body (e.g. a control unit in the main body), the application and/or application server may be configured to determine information about consumable material contained in the consumable by comparing one or more measured variables read from the machine readable component with a database (e.g. the one or more measured variables read from the machine readable component could be used as a "key" to look up information about consumable material contained in the consumable in the database).

The present disclosure includes the combination of the aspects and particular features described except where such a combination is clearly impermissible or expressly avoided.

Aspects and embodiments of the present disclosure will now be discussed with reference to the accompanying figures. Further aspects and embodiments will be apparent to those skilled in the art. All documents mentioned in this text are incorporated herein by reference.

FIG. 1 shows an example system 1 for managing a smoking substitute device 10.

The system 1 as shown in FIG. 1 includes a mobile device 2, an application server 4, an optional charging station 6, as well as the smoking substitute device 10.

The smoking substitute device 10 is configured to communicate wirelessly, e.g. via Bluetooth™, with an application (or "app") installed on the mobile device 2, e.g. via a suitable wireless interface (not shown) on the mobile device 2. The wireless connection between the smoking substitute device 10 and the mobile device may be occasional, or intermittent. The mobile device 2 may be a mobile phone for example. The application on the mobile phone is configured to communicate with the application server 4, via a network 8. The application server 4 may utilise cloud storage, for example.

The network 8 may include a cellular network and/or the internet.

A skilled person would readily appreciate that the mobile device 2 may be configured to communicate via the network 8 according to various communication channels, such as (but not limited to) a wireless communication channel such as via a cellular network (e.g. according to a standard protocol, such as 3G or 4G) or via a WiFi network.

The app installed on the mobile device and the application server 4 may be configured to assist a user with their smoking substitute device 10, based on information communicated between the smoking substitute device 10 and the app and/or information communicated between the app and the application server 4.

The smoking substitute device 10 may also be configured to communicate non-wirelessly, e.g. via a wire, with the application installed on the mobile device 2, e.g. via a suitable interface (e.g. a USB port; not shown) on the mobile device 2.

The charging station 6 (if present) may be configured to charge (and optionally communicate with) the smoking substitute device 10, via a charging port on the smoking substitute device 10. The charging port on the smoking substitute device 10 may be a USB port, for example, which may allow the smoking substitute device to be charged by any USB-compatible device capable of delivering power to the smoking substitute device 10 via a suitable USB cable (in this case the USB-compatible device would be acting as the charging station 6). Alternatively, the charging station could be a docking station specifically configured to dock with the smoking substitute device 10 and charge the smoking substitute device 10 via the charging port on the smoking substitute device 10.

FIG. 2(a) shows an example smoking substitute device 110 for use as the smoking substitute device 10 in the system 1 of FIG. 1.

In this example, the smoking substitute device 110 includes a main body 120 and a consumable 150. The consumable 150 may alternatively be referred to as a "pod."

In this example, the smoking substitute device 110 is a closed system vaping device, wherein the consumable 150 includes a sealed tank 156 configured to contain e-liquid and is intended for one-use only.

FIG. 2(a) shows the smoking substitute device 110 with the main body 120 physically coupled to the consumable 150.

FIG. 2(b) shows the main body 120 of the smoking substitute device 110 without the consumable 150.

FIG. 2(c) shows the consumable 150 of the smoking substitute device 110 without the main body 120.

The main body 120 and the consumable 150 are configured to be physically coupled together, in this example by pushing the consumable 150 into an aperture in a top end 122 of the main body 120. In other examples, the main body 120 and the consumable could be physically coupled together by screwing one onto the other, or through a bayonet fitting, for example. An optional light 126, e.g. an LED located behind a small translucent cover, is located a bottom end 124 of the main body 120. The light 126 may be configured to illuminate when the smoking substitute device 110 is activated.

The consumable 150 includes a mouthpiece (not shown) at a top end 152 of the consumable 150, as well as one or more air inlets (not shown in FIG. 2) so that air can be drawn into the smoking substitute device 110 when a user inhales through the mouthpiece. At a bottom end 154 of the consumable 150, there is located a tank 156 that contains e-liquid. The tank 156 may be a translucent body, for example.

In certain non-limiting embodiments, the tank 156 includes a window 158, so that the amount of e-liquid in the tank 156 can be visually assessed. The main body 120 includes a slot 127 so that the window 158 of the consumable 150 can be seen whilst the rest of the tank 156 is obscured from view when the consumable 150 is inserted into the aperture in the top end 122 of the main body 120.

The tank 156 may be referred to as a "clearomizer" if it includes a window 158, or a "cartomizer" if it does not.

Figure 3A:
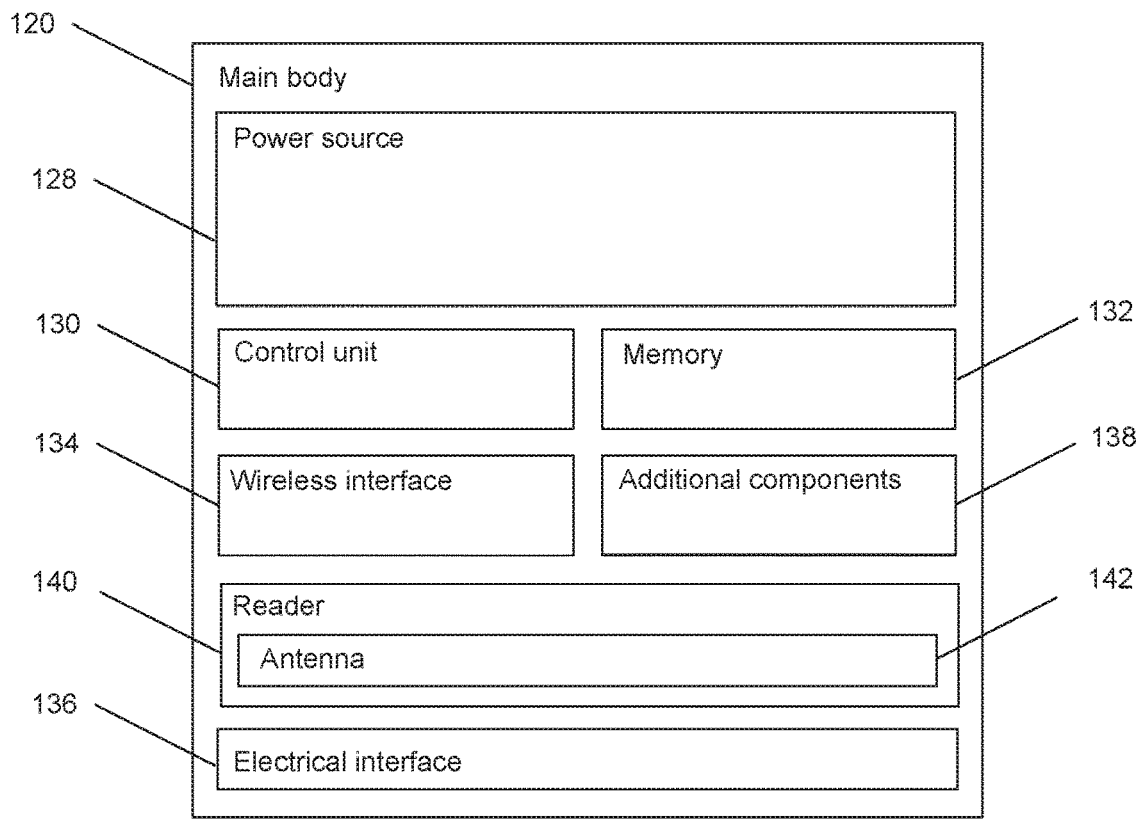
FIG. 3(a) is a schematic view of the main body of the smoking substitute device of FIG. 2(a).

FIG. 3(a) is a schematic view of the main body 120 of the smoking substitute device 110.

Figure 3B:
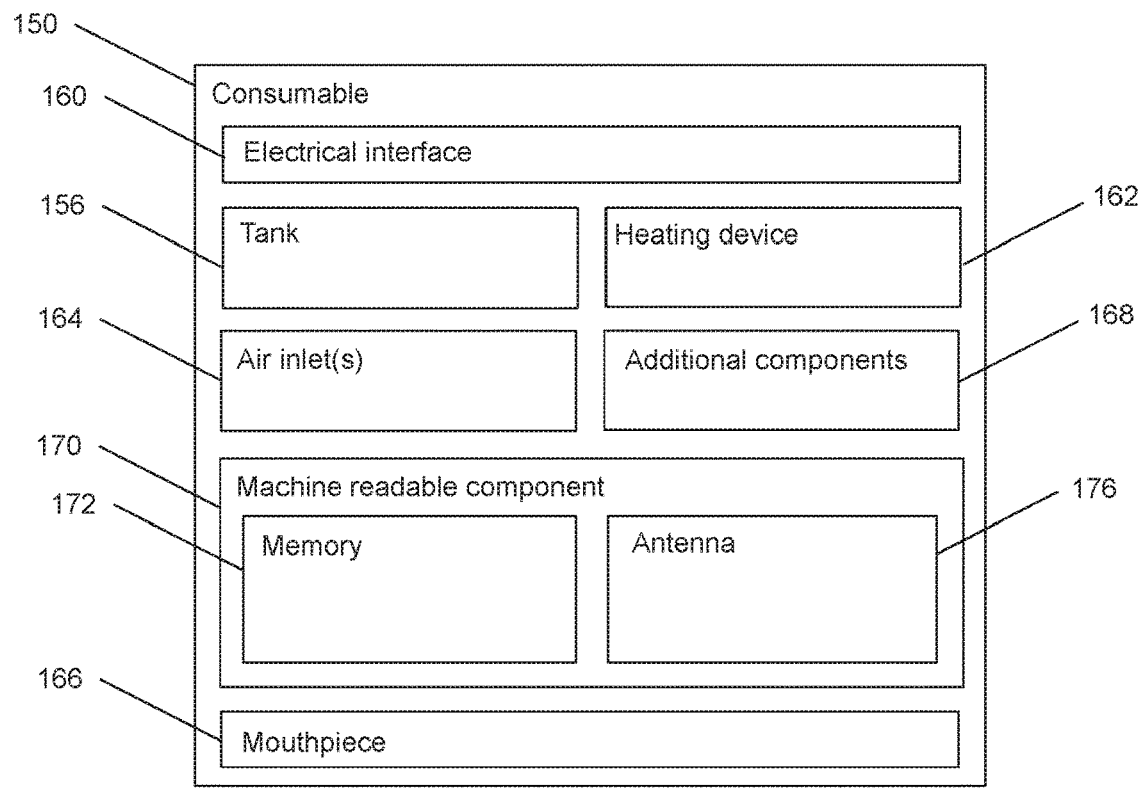
FIG. 3(b) is a schematic view of the consumable of the smoking substitute device of FIG. 2(a).

FIG. 3(b) is a schematic view of the consumable 150 of the smoking substitute device 110.

As shown in FIG. 3(a), the main body 120 includes a power source 128, a control unit 130, a memory 132, a wireless interface 134, a reader 140, an electrical interface 136, and, optionally, one or more additional components 138.

The power source 128 is, for example but not by way of limitation, a battery, such as (but not limited to) a rechargeable battery.

The control unit 130 may include a microprocessor, for example.

In certain non-limiting embodiments, the memory 132 includes non-volatile memory.

The reader 140 is configured to read information associated with the consumable 150 stored by the machine readable component 170. The reader 140 and the machine readable component 170 may be configured to read the information associated with the consumable 150 that is stored by the machine readable component 170 wirelessly (using e.g. one of NFC, Bluetooth or Wi-Fi technology) or non-wirelessly (using e.g. wires).

In certain non-limiting embodiments, the reader 140 includes an antenna 142 to wirelessly receive a signal containing information associated with the consumable 150 from the machine readable component 170. The machine readable component 170 may include an antenna 176 to transmit a signal containing information associated with the consumable 150 which can be read by the reader 140. In another example, the reader 140 may include a camera for optically reading information stored by the machine readable component 170.

In certain non-limiting embodiments, the reader 140 is an RFID reader 140 and the machine readable component 170 an RFID tag 170, such that the RFID reader 140 is configured to read a signal (in the form of electromagnetic waves, typically radio waves) containing information associated with the consumable that has been transmitted by the RFID tag 170.

The machine readable component 170 and the reader 140 may be respectively located on/in the consumable 150 and the main body 120 such that the RFID reader may only able to read information stored by the machine readable component 170 when the consumable 150 is physically coupled to the main body 120.

In certain non-limiting embodiments, the wireless interface 134 is configured to communicate wirelessly with the mobile device 2, e.g. via Bluetooth. To this end, the wireless interface 134 could include a Bluetooth™ antenna. Other wireless communication interfaces, e.g. Wi-Fi, are also possible.

In certain non-limiting embodiments, the wireless interface 134 is configured to communicate to the mobile device 2 information associated with the consumable 150 that has been received by the reader 140 from the machine readable component 170. The wireless interface 134 may be configured to communicate the information associated with the consumable 150 directly to the mobile device on which the application is installed.

The electrical interface 136 of the main body 120 may include one or more electrical contacts. The electrical interface 136 may be located in, and in certain non-limiting embodiments at the bottom of, the aperture in the top end 122 of the main body 120. When the main body 120 is physically coupled to the consumable 150, the electrical interface 136 may be configured to pass electrical power from the power source 128 to the heating device of the consumable 150 when the smoking substitute device 110 is activated, e.g. via the electrical interface 160 of the consumable 150 (discussed below). When the main body 120 is not physically coupled to the consumable 150, the electrical interface may be configured to receive power from the charging station 6.

The additional components 138 of the main body 120 may include the optional light 126 discussed above.

The additional components 138 of the main body 120 may, if the power source 128 is a rechargeable battery, include a charging port configured to receive power from the charging station 6. This may be located at the bottom end 124 of the main body 120. Alternatively, the electrical interface 136 discussed above is configured to act as a charging port configured to receive power from the charging station 6 such that a separate charging port is not required.

The additional components 138 of the main body 120 may, if the power source 128 is a rechargeable battery, include a battery charging control circuit, for controlling the charging of the rechargeable battery. However, a battery charging control circuit could equally be located in the charging station 6 (if present).

The additional components 138 of the main body 120 may include an airflow sensor for detecting airflow in the smoking substitute device 110, e.g. caused by a user inhaling through a mouthpiece 166 (discussed below) of the smoking substitute device 110. The smoking substitute device 110 may be configured to be activated when airflow is detected by the airflow sensor. This optional sensor could alternatively be included in the consumable 150 (though this is less desirable where the consumable 150 is intended to be disposed of after use, as in this example).

The additional components 138 of the main body 120 may include an actuator, e.g. a button. The smoking substitute device 110 may be configured to be activated when the actuator is actuated. This provides an alternative to the airflow sensor noted, as a mechanism for activating the smoking substitute device 110.

As shown in FIG. 3(b), the consumable 150 includes the tank 156, an electrical interface 160, a heating device 162, one or more air inlets 164, a machine readable component 170, a mouthpiece 166, and, optionally, one or more additional components 168. The electrical interface 160 of the consumable 150 may include one or more electrical contacts. In certain non-limiting embodiments, the electrical interface 136 of the main body 120 and an electrical interface 160 of the consumable 150 are configured to contact each other and therefore electrically couple the main body 120 to the consumable 150 when the main body 120 is physically coupled to the consumable 150. In this way, electrical energy (e.g. in the form of an electrical current) is able to be supplied from the power source 128 in the main body 120 to the heating device 162 in the consumable 150.

In certain non-limiting embodiments, the heating device 162 is configured to heat e-liquid contained in the tank 156, e.g. using electrical energy supplied from the power source 128. In one example, the heating device 162 may include a heating filament and a wick, wherein a first portion of the wick extends into the tank 156 in order to draw e-liquid out from the tank 156, and wherein the heating filament coils around a second portion of the wick located outside the tank 156. In this example, the heating filament is configured to heat up e-liquid drawn out of the tank 156 by the wick to produce an aerosol vapour.

In certain non-limiting embodiment, the one or more air inlets 164 are configured to allow air to be drawn into the smoking substitute device 110, when a user inhales through the mouthpiece 166.

In use, a user activates the smoking substitute device 110, e.g. through actuating an actuator included in the main body 120 or by inhaling through the mouthpiece 166 as described above. Upon activation, the control unit 130 may supply electrical energy from the power source 128 to the heating device 162 (via electrical interfaces 136, 166), which may cause the heating device 162 to heat e-liquid drawn from the tank 156 to produce a vapour which is inhaled by a user through the mouthpiece 166.

The machine readable component 170 is configured such that information associated with the consumable 150 can be read from machine readable component 170 by the reader 140.

The machine readable component 170 may include a memory 172 and an antenna 176.

In certain non-limiting embodiments, the memory 172 includes a non-volatile memory. In certain non-limiting embodiments, the memory 172 stores information associated with the consumable 150, which may include one or more variables measured by a measuring component 273 (discussed with reference to FIG. 6). Additionally/alternatively, the memory 172 may be configured to store pre-programmed information associated with the consumable 150.

In certain non-limiting embodiments, the antenna 176 wirelessly transmits a signal containing the information associated with the consumable 150 such that the signal can be received by the antenna 142 of the reader 140 included in the main body 120. Alternatively, the information can also be transferred from the machine readable component 170 to the reader 140 non-wirelessly via electrical coupling of the main body 120 with the consumable 150.

In certain non-limiting embodiments, the machine readable component 170 is a passive RFID tag, and the reader 140 is an RFID reader. The RFID tag could also be an active RFID tag.

In another example, the mobile device 2 could be configured to read the information associated with the consumable 150 stored in the machine readable component 170, e.g. via a camera or RFID reader on the mobile device.

Of course, a skilled reader would readily appreciate that the smoking substitute device 110 shown in FIGS. 2(*a*), 2(*b*), and 2(*c*) and FIGS. 3(*a*) and 3(*b*) shows just one example implementation of a smoking substitute device, and that other forms of smoking substitute device could be used as the smoking substitute device 10 of FIG. 1.

By way of example, a HNB smoking substitute device including a main body and a consumable could be used as the smoking substitute device 10 of FIG. 1, instead of the smoking substitute device 110. One such HNB smoking substitute device is the IQOS™ smoking substitute device discussed above.

Figure 4:
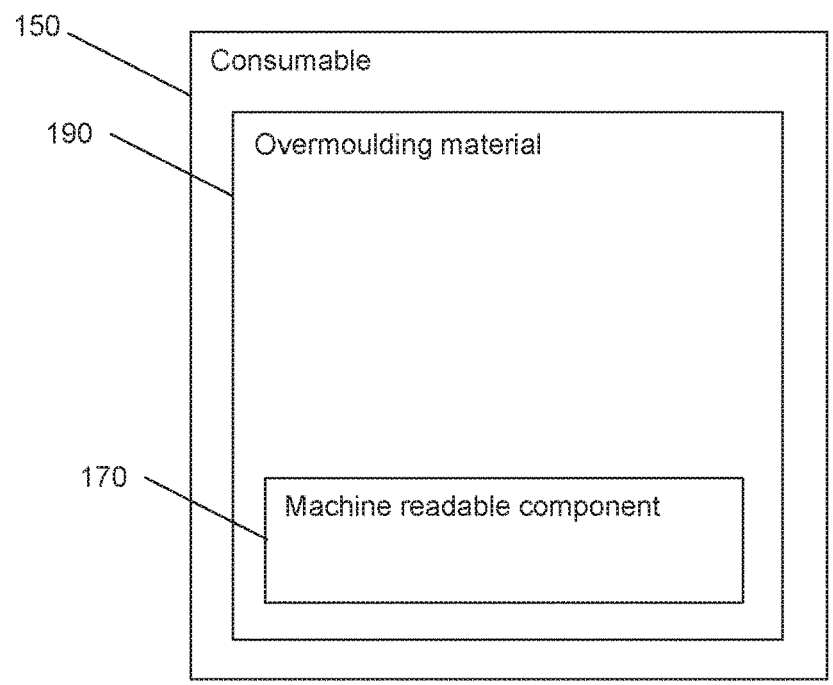
FIG. 4 is a schematic view of an example implementation of the consumable of the smoking substitute device of FIG. 2(a) including an overmoulded machine readable component.

FIG. 4 is a schematic view of an example implementation of the consumable 150 of the smoking substitute device 110 of FIG. 2(*a*), including an overmoulded machine readable component 170.

In this example, the machine readable component 170 has been encapsulated by the overmoulding material 190, and is included in the body of the consumable 150.

Figure 5:
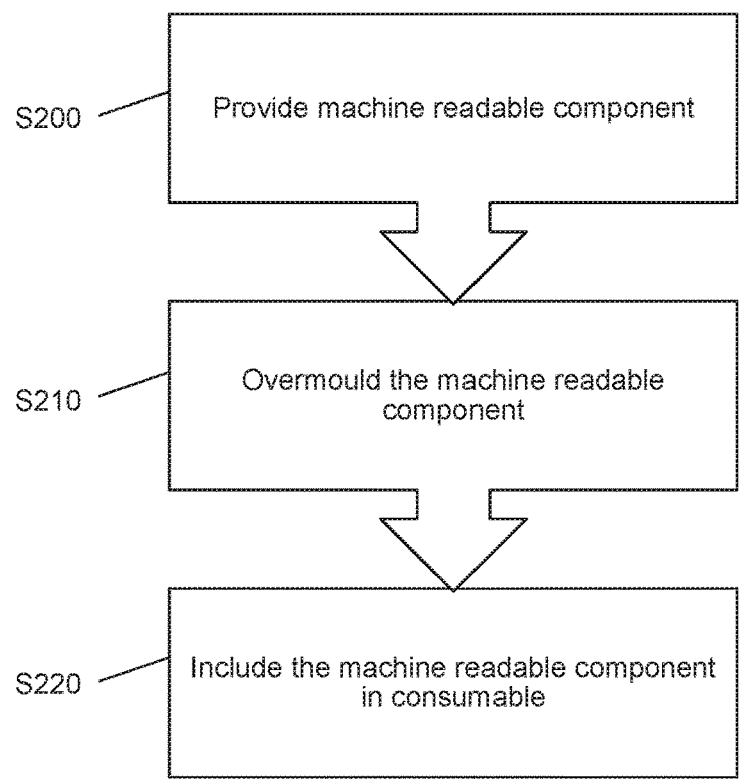
FIG. 5 illustrates a method of forming the consumable of FIG. 4.

FIG. 5 is a method of forming the consumable 150 of FIG. 4.

In the method of FIG. 5, firstly a machine readable component 170, such as (but not limited to) an RFID tag, is provided (S200). In certain non-limiting embodiments, the machine readable component 170 contains a memory to store information associated with the consumable 150.

The machine readable component 170 is positioned in a mould suitable for overmoulding, such as (but not limited to) a mould suitable for overmoulding by injection moulding. As such, the mould may be configured to withstand the high temperature of the overmoulding material without deforming.

Secondly, the machine readable component 170 is overmoulded (S210). The process of overmoulding by injection moulding may involve injecting a liquid overmoulding material into the mould containing the machine readable component 170 and then allowing the overmoulding material to solidify. The shape of the mould, and the position of the machine readable component 170 can be chosen depending upon the desired shape of the overmoulded consumable 150.

In certain non-limiting embodiments, the overmoulding process is undertaken such that the machine readable component 170 is encapsulated, e.g. as shown in FIG. 4. In this case, the mould may be chosen such that it is of a suitable shape for the liquid overmoulding material to solidify on every side of the machine readable component 170.

If the machine readable component 170 is encapsulated by the overmoulding material, the machine readable component 170 will in general need to be capable of communicating wirelessly with the reader 140.

Alternatively, the overmoulding process could be undertaken such that the machine readable component 170 is only partially coated by the overmoulding material. In this case, the shape of the mould may be chosen and the machine readable component positioned within the mould such that only a part of the machine readable component is coated by the overmoulding material.

Where only a part of the machine readable component 170 is coated in the overmoulding material, the machine readable component 170 may be configured to communicate wirelessly or non-wirelessly. To communicate non-wirelessly, the machine readable component 170 may include an electrical interface configured to couple to an electrical interface of the reader 140 (or the mobile device 2). To permit non-wireless communication, it is desirable in certain non-limiting embodiments that the overmoulding material does not coat the electrical interface.

Encapsulating or coating a part of the machine readable tag 170 may make it more waterproof, more dustproof, less vulnerable to corrosion and/or more shock resistant than a non-overmoulded machine readable component. In addition, overmoulding can be used securely join multiple components together without the need for adhesives Alternatively, the overmoulded tag may be formed in a two-step process where an initially overmoulded tag itself is overmoulded with a further overmoulding material to coat at least part of the initially overmoulded tag with the further overmoulding material, e.g. so as to further protect the tag or facilitate its attachment to other components within the consumable.

The overmoulded machine readable tag 170 may be shaped to form a component of the consumable 150. For example, the overmoulded machine readable tag 170 can be shaped as a container configured to contain consumable material within the consumable 150. In this case, the mould may be chosen such that it is of a suitable shape to overmould the machine readable tag 170 and create a desired container shape out of the overmoulded machine readable tag 170.

Overmoulding the machine readable tag 170 to form a shape of a component is advantageous because it removes the need to form that component separately, potentially reducing manufacturing costs and/or minimising the space taken up by the machine readable tag 170. Further, it means that there may be fewer components to assemble when forming the consumable 150, which could make assembly more straightforward.

Thirdly, the overmoulded machine readable component 170 is included in a consumable 150 for a smoking substitute device 110 (S220). This step may comprise assembling the multiple components shown in FIG. 3(*b*) to form the consumable 150, wherein at least one of the components is the overmoulded machine readable component 170.

In an alternative method, step S220 may occur before step 210 meaning that the machine readable component 170 is included in the consumable 150 and then the machine readable component 170 is overmoulded whilst in position in the consumable 150. This may be done to affix the machine readable component 170 to the consumable 150 without using adhesives.

Figure 6:
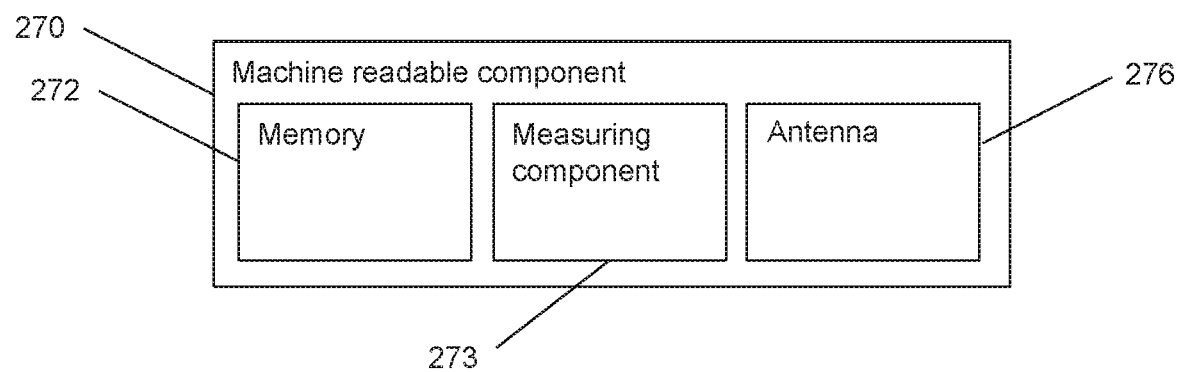
FIG. 6 is a schematic view of an example implementation of a machine readable component that could be used as the machine readable component of FIG. 2(a) or FIG. 4.

FIG. 6 is a schematic view of an example implementation of a machine readable component 270 that could be used as the machine readable component 170 of FIG. 2(*a*) or FIG. 4.

The memory 272 and the antenna 276 of the machine readable component 270 may work in a similar way to the memory 172 and the antenna 176 of the machine readable component 170 of FIG. 2(a) and need not be described in further detail.

In addition to the memory 272 and the antenna 276, machine readable component 170 of FIG. 2(a) also include a measuring component 273

The measurement component 273 of the machine readable component 270 is configured to measure a variable associated with the consumable device 150 that could be stored by the machine readable component 270, e.g. in the memory 272. The machine readable component 270 may include one or more further measurement components (not shown) configured to measure one or more further variables associated with the consumable device.

For example the measurement component 273 may be an integrated circuit, configured to measure e.g. resistance of consumable material contained in the consumable, capacitance of consumable material contained in the consumable, inductance of consumable material contained in the consumable or another measurable variable associated with the consumable 150.

In certain non-limiting embodiments, the memory 272 is configured to store the variable(s) measured by the measurement component 273. Additionally/alternatively, the memory 272 may be configured to store pre-programmed information associated with the consumable 150.

In certain non-limiting embodiments, the antenna 276 is configured to transmit a signal containing the variable measured by the measurement component 273 (as well as any additional variables measured by any further measurement components) such that the one or more measured variables can be read by an external device, for example the reader 140 of the main body 120.

Alternatively, the one or more measured variables stored by the machine readable component 270 may be read by an external device (such as the main body 120 or mobile device 2) wirelessly or non-wirelessly in an alternative manner described above.

The main body 120, mobile device 2 or application server 4 may be configured to determine information about consumable material contained in the consumable 150 (e.g. a flavour of e-liquid contained in the consumable) based on one or more measured variables read from the machine readable component 270. For example, the main body 120, application or application server 4 may be configured to determine information about consumable material contained in the consumable 150 by comparing one or more measured variables read from the machine readable component 270 with a database (e.g. the one or more measured variables read from the machine readable component 270 could be used as a "key" to look up information about consumable material contained in the consumable 150 in the database). The database may be stored at the application server 4, optionally with a copy being stored in the application or main body 120.

The features disclosed in the foregoing description, or in the following claims, or in the accompanying drawings, expressed in their specific forms or in terms of a means for performing the disclosed function, or a method or process for obtaining the disclosed results, as appropriate, may, separately, or in any combination of such features, be utilised for realising the present disclosure in diverse forms thereof.

While the present disclosure has been described in conjunction with the exemplary embodiments described above, many equivalent modifications and variations will be apparent to those skilled in the art when given this disclosure.

Accordingly, the exemplary embodiments of the present disclosure set forth above are considered to be illustrative and not limiting. Various changes to the described embodiments may be made without departing from the spirit and scope of the present disclosure.

For the avoidance of any doubt, any theoretical explanations provided herein are provided for the purposes of improving the understanding of a reader. The inventors do not wish to be bound by any of these theoretical explanations.

Any section headings used herein are for organizational purposes only and are not to be construed as limiting the subject matter described.

Throughout this specification, including the claims which follow, unless the context requires otherwise, the word "comprise" and "include," and variations such as "comprises," "comprising," and "including" will be understood to imply the inclusion of a stated integer or step or group of integers or steps but not the exclusion of any other integer or step or group of integers or steps.

It must be noted that, as used in the specification and the appended claims, the singular forms "a," "an," and "the" include plural referents unless the context clearly dictates otherwise. Ranges may be expressed herein as from "about" one particular value, and/or to "about" another particular value. When such a range is expressed, another embodiment includes from the one particular value and/or to the other particular value. Similarly, when values are expressed as approximations, by the use of the antecedent "about," it will be understood that the particular value forms another embodiment. The term "about" in relation to a numerical value is optional and means for example +/−10%.

The invention claimed is:

1. A method of forming a consumable for use in a smoking substitute device, the method comprising the steps of:
overmoulding a machine readable component with an overmoulding material to coat at least part of the machine readable component with the overmoulding material to form an overmoulded machine readable component; and
assembling together multiple components, including the overmoulded machine readable component, to form the consumable, wherein the overmoulded machine readable component is shaped as an outer casing of the consumable and is used as the outer casing of the consumable.

2. The method according to claim 1, wherein the machine readable component is encapsulated by the overmoulding material.

3. The method according to claim 1, wherein the machine readable component is partially coated by the overmoulding material.

4. The method according to claim 1, wherein the overmoulded machine readable component is overmoulded with a further overmoulding material to coat at least part of the overmoulded machine readable component with the further overmoulding material.

5. The method according to claim 1, wherein the machine readable component stores information associated with the consumable.

6. The method according to claim 5, wherein the machine readable component comprises a memory storing the information associated with the consumable.

7. The method according to claim 1, wherein the machine readable component is a radio frequency identification tag.

8. The method according to claim 5, wherein the information associated with the consumable stored by the machine readable component includes any one or more of:
- identification information for identifying the consumable;
- a flavour of consumable material contained in the consumable;
- an amount of consumable material contained in the consumable;
- a temperature at which consumable material contained in the consumable should be heated;
- a parameter indicating how the consumable should be used;
- a size of a tank included in the consumable; and/or
- one or more measured variables associated with the consumable device.

9. The method according to claim 1, wherein the multiple components of the consumable comprises at least one measuring component configured to measure a variable associated with the consumable; and wherein the step of assembling together multiple components includes assembling the at least one measuring component with the machine readable component such that the machine readable component is configured to store the/each measured variable.

10. The method according to claim 5, wherein the information associated with the consumable includes pre-programmed information.

11. The method according to claim 5, wherein the information associated with the consumable includes a measured variable associated with the consumable.

* * * * *